(12) United States Patent
Wakui et al.

(10) Patent No.: US 10,316,444 B2
(45) Date of Patent: *Jun. 11, 2019

(54) ELASTIC NETWORK STRUCTURE WITH EXCELLENT QUIETNESS AND LIGHTWEIGHT PROPERTIES

(71) Applicant: TOYOBO CO., LTD., Osaka-shi, Osaka (JP)

(72) Inventors: Hiroyuki Wakui, Otsu (JP); Shinichi Kobuchi, Osaka (JP); Teruyuki Taninaka, Otsu (JP)

(73) Assignee: TOYOBO CO., LTD., Osaka-shi (JP)

(*) Notice: Subject to any disclaimer, the term of this patent is extended or adjusted under 35 U.S.C. 154(b) by 103 days.

This patent is subject to a terminal disclaimer.

(21) Appl. No.: 15/032,506

(22) PCT Filed: Oct. 27, 2014

(86) PCT No.: PCT/JP2014/078455
§ 371 (c)(1),
(2) Date: Apr. 27, 2016

(87) PCT Pub. No.: WO2015/064523
PCT Pub. Date: May 7, 2015

(65) Prior Publication Data
US 2016/0251790 A1   Sep. 1, 2016

(30) Foreign Application Priority Data

Oct. 28, 2013 (JP) .................................. 2013-223069

(51) Int. Cl.
| | | |
|---|---|---|
| *D04H 3/16* | (2006.01) |
| *D04H 3/018* | (2012.01) |
| *D04H 3/03* | (2012.01) |
| *D04H 3/14* | (2012.01) |
| *A47C 27/12* | (2006.01) |
| *A47G 9/02* | (2006.01) |
| *B60N 2/70* | (2006.01) |
| *B61D 33/00* | (2006.01) |
| *D04H 3/011* | (2012.01) |
| *D04H 3/016* | (2012.01) |
| *D04H 3/077* | (2012.01) |

(52) U.S. Cl.
CPC ........... *D04H 3/163* (2013.01); *A47C 27/122* (2013.01); *A47G 9/0207* (2013.01); *B60N 2/70* (2013.01); *B61D 33/0035* (2013.01); *D04H 3/011* (2013.01); *D04H 3/016* (2013.01); *D04H 3/018* (2013.01); *D04H 3/03* (2013.01); *D04H 3/077* (2013.01); *D04H 3/14* (2013.01); *D10B 2331/04* (2013.01); *D10B 2403/033* (2013.01)

(58) Field of Classification Search
CPC ........ D04H 3/163; D04H 3/011; D04H 3/016; D04H 3/018; A47G 9/0207; B60N 2/70; A47C 27/122; B61D 33/0035; D10B 2331/04; D10B 2403/033
See application file for complete search history.

(56) References Cited

U.S. PATENT DOCUMENTS

| | | | |
|---|---|---|---|
| 3,852,152 A | 12/1974 | Werner et al. |
| 3,936,337 A | 2/1976 | Stapp |
| 4,012,249 A | 3/1977 | Stapp |
| 4,952,265 A | 8/1990 | Yamanaka et al. |
| 5,312,893 A | 5/1994 | Hamano et al. |
| 5,352,534 A | 10/1994 | Hamano et al. |
| 5,639,543 A | 6/1997 | Isoda et al. |
| 9,938,649 B2 * | 4/2018 | Taninaka ............... D04H 3/007 |
| 9,970,140 B2 * | 5/2018 | Taninaka ............... D04H 3/007 |
| 2002/0041949 A1 | 4/2002 | Nishibori et al. |
| 2003/0059606 A1 * | 3/2003 | Iijima ..................... B32B 7/12 |
| | | | 428/343 |

(Continued)

FOREIGN PATENT DOCUMENTS

| | | |
|---|---|---|
| EP | 2772576 A1 | 3/2014 |
| EP | 2966206 A1 | 1/2016 |

(Continued)

OTHER PUBLICATIONS

A computerized English translation to Japanese Patent Application Publication No. 2013-91862 to Wakui et al., dated May 16, 2013, obtained from the European Patent Office website. (Year: 2013).*

(Continued)

*Primary Examiner* — Jeremy R Pierce
(74) *Attorney, Agent, or Firm* — Westerman, Hattori, Daniels & Adrian, LLP

(57) ABSTRACT

The present invention provides an elastic network structure that has excellent cushioning properties and makes less sound when it is compressed and recovers its shape. A network structure including a three-dimensional random loop bonded structure obtained by forming random loops by curling treatment of a continuous linear structure comprising a thermoplastic resin, and by making each loop mutually contact in a molten state to weld the majority of contacted parts, wherein (a) the continuous linear structure is a hollow cross section, (b) the degree of hollowness of the hollow cross section is not less than 10% and not more than 50%, (c) the fiber diameter of the continuous linear structure is not less than 0.10 mm and not more than 0.65 mm, and (d) the number of bonded points per unit weight of the random loop bonded structure is not less than 200/g and less than 500/g.

7 Claims, No Drawings

(56) References Cited

U.S. PATENT DOCUMENTS

| | | | |
|---|---|---|---|
| 2007/0001336 | A1 | 1/2007 | Nishibori et al. |
| 2007/0120412 | A1 | 5/2007 | Koyano et al. |
| 2008/0146763 | A1 | 6/2008 | Yamanaka et al. |
| 2013/0020016 | A1 | 1/2013 | Takaoka |
| 2013/0189472 | A1 | 7/2013 | Takaoka |
| 2015/0010250 | A1 | 1/2015 | Omi |
| 2015/0087196 | A1 | 3/2015 | Wakui et al. |
| 2016/0010250 | A1 | 1/2016 | Taninaka et al. |
| 2016/0347603 | A1 | 12/2016 | Zammit et al. |

FOREIGN PATENT DOCUMENTS

| | | |
|---|---|---|
| JP | 55-31222 B1 | 8/1980 |
| JP | 1-207462 A | 8/1989 |
| JP | 6-25441 A | 2/1994 |
| JP | 7-60861 A | 3/1995 |
| JP | 7-68061 A | 3/1995 |
| JP | 7-173753 A | 7/1995 |
| JP | 7-189105 A | 7/1995 |
| JP | 7-327436 A | 12/1995 |
| JP | 8-13310 A | 1/1996 |
| JP | H08-13310 A | 1/1996 |
| JP | H08-196755 A | 8/1996 |
| JP | 200073271 A | 3/2000 |
| JP | 2000-328422 A | 11/2000 |
| JP | 2001-3257 A | 1/2001 |
| JP | 2001-61605 A | 3/2001 |
| JP | 2002-61059 A | 2/2002 |
| JP | 2002-266223 A | 9/2002 |
| JP | 2004-244740 A | 9/2004 |
| JP | 2006-200118 A | 8/2006 |
| JP | 2010-43376 A | 2/2010 |
| JP | 2013-090658 A | 5/2013 |
| JP | 2013-091862 A | 5/2013 |
| JP | 5418741 B1 | 2/2014 |
| JP | 5454733 B1 | 3/2014 |
| JP | 5454734 B1 | 3/2014 |
| WO | 2014/132484 A1 | 9/2014 |

OTHER PUBLICATIONS

Extended (supplementary) European Search Report dated Dec. 10, 2015, issued in European Application No. 13788112.4 (counterpart to U.S. Appl. No. 14/399,244). (6 pages).
Office Action dated Nov. 25, 2015, issued in Chinese Application No. 201380024126.6 (counterpart to U.S. Appl. No. 14/399,244), with English translation. (18 pages).
Non-Final Office Action dated Jan. 11, 2017, issued in U.S. Appl. No. 14/399,244. (16 pages).
Search Report dated May 16, 2017, issued in counterpart European Application No. 14858724.9 (6 pages).
Final Office Action dated May 19, 2017, issued in U.S. Appl. No. 14/399,244 (19 pages).
Notification of Reason for Rejection dated Mar. 11, 2014, issued in counterpart Japanese Patent Application No. 2013-223069, w/English translation (6 pages).
International Search Report dated Jan. 27, 2014, issued in counterpart International Application No. PCT/JP2014/078455 (2 pages).
Advisory Action dated Nov. 24, 2017, issued in U.S. Appl. No. 14/399,244 (3 pages).
Non-Final Office Action dated Apr. 6, 2018, issued in U.S. Appl. No. 14/399,244. (16 pages).
International Search Report dated Jan. 13, 2015, issued in International Application No. PCT/JP2014/078562 (which is counterpart to U.S. Appl. No. 15/032,924). (2 pages).
Extended (supplementary) European Search Report dated Jun. 19, 2017, issued in European Application No. 14858976.5 (which is counterpart to U.S. Appl. No. 15/032,924). (6 pages).
Extended (supplementary) European Search Report dated Aug. 5, 2016, issued in European Application No. 14850151.3 (which is counterpart to U.S. Appl. No. 15/026,424). (8 pages).
Office Action dated Jul. 3, 2017, issued in European Application No. 14850151.3 (which is counterpart to U.S. Appl. No. 15/026,424). (4 pages).
Office Action dated Mar. 6, 2018, issued in European Application No. 14850151.3 (which is counterpart to U.S. Appl. No. 15/026,424). (4 pages).
International Search Report dated Jan. 13, 2015, issued in International Application No. PCT/JP2014/076150 (which is counterpart to U.S. Appl. No. 15/026,424). (2 pages).
Final Office Action dated Nov. 1, 2018, issued in U.S. Appl. No. 14/399,244. (21 pages).
Non-Final Office Action dated Jul. 13, 2017, issued in U.S. Appl. No. 15/026,424. (13 pages).
Non-Final Office Action dated Sep. 1, 2016, issued in U.S. Appl. No. 15/026,424. (11 pages).
Final Office Action dated Dec. 21, 2016, issued in U.S. Appl. No. 15/026,424. (13 pages).
Non-Final Office Action dated Feb. 23, 2017, issued in U.S. Appl. No. 15/032,924. (14 pages).
Final Office Action dated Aug. 23, 2017, issued in U.S. Appl. No. 15/032,924. (11 pages).
Advisory Action dated Feb. 7, 2019, issued in U.S. Appl. No. 14/399,244 (11 pages).

\* cited by examiner

ELASTIC NETWORK STRUCTURE WITH EXCELLENT QUIETNESS AND LIGHTWEIGHT PROPERTIES

TECHNICAL FIELD

The present invention relates to an elastic network structure including a three-dimensional random loop bonded structure made of a continuous linear structure.

BACKGROUND ART

There has been proposed a three-dimensional random loop bonded structure obtained by forming random loops by curling treatment of a continuous linear structure including a polyester thermoplastic elastic resin, and by making each loop mutually contact in a molten state to weld the majority of contacted parts (Patent Document 1). Also, from the viewpoint of improving lightweight properties, a three-dimensional random loop bonded structure in which the cross sectional structure of a continuous linear structure is a hollow cross section is suggested (Patent Documents 2 and 3). However, there has been a problem in that, when the three-dimensional random loop bonded structure is compressed and recovers its shape, it makes a sound like the random loops being rubbed together or a sound like the random loops being popped, and in the case of being used in bedding, it is loud and interrupts sleep.

In contrast to this, there has been proposed a cushioning material obtained by forming random loops by curling treatment of continuous linear structure including a polyester copolymer and having a fineness of 300 decitex or greater; making each loop mutually contact in a molten state to weld the majority of contacted parts to thereby obtain a three-dimensional random loop bonded structure; and attaching silicone resin to the surfaces of the random loops of the three-dimensional random loop bonded structure (Patent Document 4). However, when the cushioning material is compressed and recovers its shape, although the sound like the random loops being rubbed together is small, the sound like the random loops being popped is still given out. Therefore, there has been room for improvement in terms of quietness. Furthermore, the step of attaching silicone resin to the surfaces of the random loops is a separate step from that for the three-dimensional random loop bonded structure, and also the steps are performed in batches. Therefore, there has been a problem in terms of production.

PRIOR ART DOCUMENT

Patent Documents

Patent Document 1: JP-A-H07-68061
Patent Document 2: JP-A-H07-173753
Patent Document 3: JP-A-H07-60861
Patent Document 4: JP-A-2010-43376

SUMMARY OF THE INVENTION

Problems to be Solved by the Invention

An object of the present invention is to provide an elastic network structure that has excellent lightweight properties and makes less sounds when it is compressed and recovers its shape.

Solutions to the Problems

The present inventors have considered that reducing the fiber diameter of the continuous linear structure, and further, increasing the number of bonded points of the three-dimensional random loop bonded structure would decrease rigidity of the random loops and reduce a popping sound, and also fix the random loops and reduce the frequency of the popping of the random loops and that this would improve the quietness of the network structure, and have made earnest examination. As a result, the inventors have found that, in the three-dimensional random loop bonded structure in which the continuous linear structure is a hollow cross section, by controlling the fiber diameter of the continuous linear structure to a specific range, and also controlling the number of bonded points of the three-dimensional random loop bonded structure, a network structure makes less sounds when it is compressed and recovers its shape and has excellent lightweight properties. Then, the inventors have accomplished the present invention.

That is, the present invention includes the following configurations.

(Item 1)
A network structure comprising a three-dimensional random loop bonded structure obtained by forming random loops by curling treatment of a continuous linear structure comprising a thermoplastic resin, and by making each loop mutually contact in a molten state to weld the majority of contacted parts, wherein
  (a) the continuous linear structure is a hollow cross section,
  (b) the degree of hollowness of the hollow cross section is not less than 10% and not more than 50%,
  (c) the fiber diameter of the continuous linear structure is not less than 0.10 mm and not more than 0.65 mm, and
  (d) the number of bonded points per unit weight of the random loop bonded structure is not less than 200/g and less than 500/g.

(Item 2)
The network structure according to Item 1, wherein the degree of hollowness of the hollow cross section is not less than 15% and not more than 45%.

(Item 3)
The network structure according to Items 1 to 2, wherein the compression-deflection coefficient of the random loop bonded structure is not less than 2.7.

(Item 4)
The network structure according to Item 3, wherein the compression-deflection coefficient of the random loop bonded structure is not less than 3.0.

(Item 5)
The network structure according to any one of Items 1 to 4, wherein the thermoplastic resin is at least one thermoplastic resin selected from the group consisting of a soft polyolefin, an ethylene-vinyl acetate copolymer, a polystyrene thermoplastic elastomer, a polyester thermoplastic elastomer, a polyurethane thermoplastic elastomer and a polyamide thermoplastic elastomer.

(Item 6)
The network structure according to Item 5, wherein the thermoplastic resin is at least one thermoplastic resin selected from the group consisting of a soft polyolefin, an ethylene-vinyl acetate copolymer, and a polyester thermoplastic elastomer.

(Item 7)
The network structure according to Item 6, wherein the thermoplastic resin is a polyester thermoplastic elastomer.

Effects of the Invention

Conventional network structures make a sound like random loops being rubbed together or a sound like the random loops being popped when the network structures are compressed or recover their shapes. In this regard, a network structure according to the present invention has excellent effects in greatly reducing the sounds, and having a lightweight equivalent to or greater than the conventional network structures.

MODE FOR CARRYING OUT THE INVENTION

A network structure according to the present invention forms a three-dimensional network structure in such a manner that a linear structure (in this specification, this may be referred to as a "continuous linear structure") including a thermoplastic resin is curled; and the linear structures are brought into mutual contact and the contacted parts are welded. Thereby, even in case of application of a large deformation based on a very large stress, whole of a network structure including three-dimensional random loops obtained by mutual welding and integration will deform to absorb a stress. Furthermore, when the stress is removed, the structure can recover an original shape thereof by an elastic force of the thermoplastic resin.

The thermoplastic resin is not particularly limited as long as the linear structures can be curled and brought into mutual contact and the contacted parts can be welded. In terms of satisfying both lightweight properties and quietness, and also exhibiting comfortable cushioning properties, the thermoplastic resin is preferably a soft polyolefin, an ethylene-vinyl acetate copolymer, a polystyrene thermoplastic elastomer, a polyester thermoplastic elastomer, a polyurethane thermoplastic elastomer or a polyamide thermoplastic elastomer, more preferably a soft polyolefin, an ethylene-vinyl acetate copolymer, or a polyester thermoplastic elastomer. Furthermore, among them, for the purpose of satisfying both lightweight properties and quietness, while exhibiting comfortable cushioning properties, and also improving heat resistance and durability, a polyester thermoplastic elastomer is particularly preferable.

Preferred examples of the soft polyolefin include low density polyethylene (LDPE), random copolymers of ethylene and an α-olefin with a carbon number of not less than 3, and block copolymers of ethylene and an α-olefin with a carbon number of not less than 3. Preferred examples of the α-olefin with a carbon number of not less than 3 include propylene, isoprene, butene-1, pentene-1, hexene-1,4-methyl-1-pentene, heptene-1, octene-1, nonene-1, decene-1, undecene-1, dodecene-1, tridecene-1, tetradecene-1, pentadecene-1, hexadecene-1, heptadecene-1, octadecene-1, nonadecene-1 and eicosene-1. More preferred examples thereof include propylene and isoprene. Furthermore, two or more of these α-olefins may be used in combination.

As the ethylene-vinyl acetate copolymer, the specific weight of the polymer constituting a network structure is preferably not less than 0.91 and not more than 0.965. The specific weight varies according to the vinyl acetate content, and the vinyl acetate content is preferably not less than 1% and not more than 35%. When the vinyl acetate content is small, rubber elasticity may decrease. From this viewpoint, the vinyl acetate content is preferably not less than 1%, further preferably not less than 5%, and particularly preferably not less than 10%. When the vinyl acetate content is large, rubber elasticity is excellent, but the melting point is lowered and thermal resistance may decrease. Thus, from this viewpoint, the vinyl acetate content is preferably not more than 35%, further preferably not more than 30%, and particularly preferably not more than 26%.

Preferred examples of the polyester thermoplastic elastomer include polyester-ether block copolymers whose hard segment is a thermoplastic polyester and whose soft segment is a polyalkylene diol; and polyester-ester block copolymers whose soft segment is an aliphatic polyester. More specific examples of the polyester-ether block copolymer are triblock copolymers formed of at least one dicarboxylic acid selected from aromatic dicarboxylic acids such as terephthalic acid, isophthalic acid, naphthalene-2,6-dicarboxylic acid, naphthalene-2,7-dicarboxylic acid and diphenyl-4,4'-dicarboxylic acid, alicyclic dicarboxylic acids such as 1,4 cyclohexane dicarboxylic acid, aliphatic dicarboxylic acids such as succinic acid, adipic acid, sebacic acid and dimer acid, and ester-forming derivatives of these dicarboxylic acids, etc.; at least one diol component selected from aliphatic diols such as 1,4-butanediol, ethylene glycol, trimethylene glycol, tetramethylene glycol, pentamethylene glycol and hexamethylene glycol, alicyclic diols such as 1,1-cyclohexane dimethanol and 1,4-cyclohexane dimethanol, and ester-forming derivatives of these diols, etc.; and at least one polyalkylene diol selected from polyethylene glycol, polypropylene glycol, polytetramethylene glycol and ethylene oxide-propylene oxide copolymers etc. which have an average molecular weight of not less than 300 and not more than 5000. Examples of the polyester-ester block copolymer include triblock copolymers formed from the above-mentioned dicarboxylic acid and diol and at least one of polyester diols such as polylactone having an average molecular weight of not less than 300 and not more than 5000. In consideration of thermal bonding properties, hydrolysis resistance, flexibility and heat resistance etc., preferred polyester-ester block copolymers are (1) a triblock copolymer formed terephthalic acid and/or isophthalic acid as a dicarboxylic acid; 1,4-butanediol as a diol component; and polytetramethylene glycol as a polyalkylene diol and (2) a triblock copolymer formed terephthalic acid or/and naphthalene-2,6-dicarboxylic acid as a dicarboxylic acid; 1,4-butanediol as a diol component; and polylactone as a polyester diol. Particularly preferred is (1) a triblock copolymer formed terephthalic acid and/or isophthalic acid as a dicarboxylic acid; 1,4-butanediol as a diol component; and polytetramethylene glycol as a polyalkylene diol. In special cases, one to which a polysiloxane soft segment has been introduced can also be used.

Preferred examples of the polystyrene thermoplastic elastomer include random copolymers of styrene and butadiene, block copolymers of styrene and butadiene, random copolymers of styrene and isoprene, block copolymers of styrene and isoprene, and hydrogenated products of these.

A typical example of the polyurethane thermoplastic elastomer can include a polyurethane elastomer obtained by using a prepolymer, which has isocyanate groups at both ends and is obtained by allowing (A) a polyether and/or polyester having a number average molecular weight of not less than 1000 and not more than 6000 and having hydroxyl groups at end(s) to react with (B) a polyisocyanate whose main component is an organic diisocyanate in the presence or absence of usual solvent (dimethylformamide, dimethylacetamide etc.), and extending the chain of the prepolymer with (C) a polyamine whose main component is a diamine. Preferred as the (A) polyester and/or polyether are polybutylene adipate copolyesters and polyalkylene diols such as polyethylene glycol, polypropylene glycol, polytetramethylene glycol and ethylene oxide-propylene oxide copolymers, which have an average molecular weight of not less than 1000 and not more than 6000, preferably not less than 1300 and not more than 5000. As the (B) polyisocyanate, a conventionally known polyisocyanate can be used. An isocyanate including diphenylmethane-4,4'-diisocyanate as a main component, to which a minute amount of a conventionally known triisocyanate etc. has been added according to need, may also be used. As the (C) polyamine, a polyamine including as a main component a known diamine such as ethylenediamine or 1,2-propylenediamine, to which a minute amount of a triamine and/or tetraamine has been added according to need, may also be used. These polyurethane thermoplastic elastomers may be used alone or two or more of the elastomers may be used in combination. Furthermore, the thermoplastic elastomer of the present invention also encompasses a blend of the above-mentioned elastomer and a non-elastomer component, and a copolymer of the above-mentioned elastomer and a non-elastomer component, etc.

A preferred example of the polyamide thermoplastic elastomer can include a polyamide thermoplastic elastomer obtained by using block copolymers alone or two or more of them in combination, the block copolymer including a hard segment in which Nylon 6, Nylon 66, Nylon 610, Nylon 612, Nylon 11, Nylon 12 etc. or a copolyamide of any of these nylons is used as a skeleton and a soft segment containing at least one of polyalkylene diols such as polyethylene glycol, polypropylene glycol, polytetramethylene glycol and ethylene oxide-propylene oxide copolymers having an average molecular weight of not less than 300 and not more than 5000. Furthermore, those with which a non-elastomer component has been blended or copolymerized, etc. may also be used in the present invention.

The continuous linear structure included in the network structure of the present invention can be formed from a mixture of two or more different thermoplastic resins depending on the purpose. In the case where the continuous linear structure is formed from a mixture of two or more different thermoplastic resins, at least one thermoplastic resin selected from the group consisting of a soft polyolefin, an ethylene-vinyl acetate copolymer, a polystyrene thermoplastic elastomer, a polyester thermoplastic elastomer, a polyurethane thermoplastic elastomer and a polyamide thermoplastic elastomer is contained in an amount of preferably not less than 50% by weight, more preferably not less than 60% by weight, even more preferably not less than 70% by weight.

Depending on the purpose, various additives can be added to a resin portion of the continuous linear structure constituted the network structure of the present invention. Examples of the additives that can be added include plasticizers of phthalic acid ester type, trimellitic acid ester type, fatty acid type, epoxy type, adipic acid ester type and polyester type; antioxidants of known hindered phenol type, sulfur type, phosphorus type and amine type; light stabilizers of hindered amine type, triazole type, benzophenone type, benzoate type, nickel type and salicylic type; antistatic agents; molecular regulators such as peroxides; reactive group-containing compounds such as epoxy compounds, isocyanate compounds and carbodiimide compounds; metal deactivators; organic and inorganic nucleating agents; neutralizers; antacids; anti-microbial agents; fluorescent whitening agents; fillers; flame retardants; flame retardant aids; and organic and inorganic pigments, etc.

It is preferable that the continuous linear structure constituted the network structure of the present invention have, on a melting curve determined with a differential scanning calorimeter (DSC), an endothermic peak equal to or below the melting point. A continuous linear structure having an endothermic peak equal to or below the melting point has heat resistance and settling resistance remarkably improved as compared to that having no endothermic peak. For example, a preferred polyester thermoplastic elastomer of the present invention is obtained by performing transesterification between an acid component of hard segment containing not less than 90 mol %, more preferably not less than 95 mol %, particularly preferably 100 mol % terephthalic acid and/or naphthalene-2,6-dicarboxylic acid etc. having rigidity and a glycol component; and thereafter performing polymerization to a necessary polymerization degree; and next performing copolymerization with a preferably not less than 10% by weight and not more than 70% by weight, more preferably not less than 20% by weight and not more than 60% by weight of polytetramethylene glycol, as polyalkylene diol, having an average molecular weight of preferably not less than 500 and not more than 5000, more preferably not less than 1000 and not more than 3000. In this case, if the acid component of the hard segment contains a large amount of terephthalic acid and/or naphthalene-2,6-dicarboxylic acid having rigidity, the crystallinity of the hard segment is improved, the hard segment is unlikely to be plastically deformed, and the heat resistance and settling resistance are improved. In addition, if an annealing treatment is performed at a temperature at least 10° C. or more lower than the melting point after thermal bonding, the heat resistance and settling resistance are more improved. If the annealing is performed after a compressive strain is imparted, the heat resistance and settling resistance are even more improved. A linear structure of the network structure subjected to such a treatment more clearly shows an endothermic peak at temperatures not lower than room temperature and not higher than the melting point, on the melting curve determined with a differential scanning calorimeter (DSC). It should be noted that, in the case where the annealing is not performed, the linear structure shows no endothermic peak at temperatures not lower than room temperature and not higher than the melting point on the melting curve. Accordingly, it is assumed that the annealing causes rearrangement of the hard segment and forms pseudo-crystal-like crosslinkages, and that this improves the heat resistance and settling resistance. (This annealing treatment may be hereinafter referred to as a "pseudo-crystallization treatment".) The effect of this pseudo-crystallization treatment also applies to a soft polyolefin, a polystyrene thermoplastic elastomer, a polyamide thermoplastic elastomer, and a polyurethane thermoplastic elastomer.

The cross sectional shape of the linear structure forming the network structure of the present invention is a hollow cross section. The cross sectional shape of the linear structure is made to a hollow cross section, whereby, in the case where the same compression resistance is imparted, it is possible to obtain a more lightweight structure which contributes to energy saving when used for a seat of an automobile, and improves, in the case of a futon (Japanese-style mattress) or the like, handleability of raising and lowering it. The degree of hollowness of the hollow cross section is preferably in a range of not less than 10% and not more than 50%, and more preferably in a range of not less than 15% and not more than 45%. The degree of hollowness is obtained by averaging degrees of hollowness of the linear structure collected from 20 points in a length of about 1 cm within 3096 from the thickness center point in the thickness direction of the network structure. The degree of hollowness is measured by a method that the collected linear structures are cooled with liquid nitrogen or the like, and then cut into pieces, and the cross section of each piece is observed under an electron microscope at an appropriate magnification, the obtained image is analyzed using a CAD system or the like, and thereby the cross sectional area (A) of a resin portion and the cross sectional area (B) of a hollow portion are measured, and the degree of hollowness is calculated through the equation $\{B/(A+B)\} \times 100$. In the case where the degree of hollowness is lower than 10%, a sufficient lightweight effect is not obtained, and in the case where the degree of hollowness is higher than 50%, the cross section of the linear structure is likely to be crushed, and appropriate cushioning properties may not be maintained.

The fiber diameter of the linear structure forming the network structure of the present invention is not less than 0.10 mm and not more than 0.65 mm, and the number of bonded points per unit weight of the random loop bonded structure is not less than 200/g and less than 500/g. The fiber diameter is obtained by averaging fiber diameters of the linear structure collected from 10 points in a length of about 5 mm within 30% from the thickness center point in the thickness direction of the network structure. The fiber diameter is measured by a method that the side of the linear structure is focused at a proper magnification and imaged using an optical microscope, and the length in a direction perpendicular to a longitudinal direction of the linear structure is measured from the resulting image. On the other hand, a bonded point means a welded part between two linear structures, and the number of bonded points per unit weight (unit: the number of bonded points/g) is a value obtained by, about a piece in the form of a rectangular parallelepiped prepared by cutting a network structure into the shape of a rectangular parallelepiped measuring 5 cm in length×5 cm in width so that the rectangular parallelepiped includes two surface layers of the sample but does not include the peripheral portion of the sample, dividing the number of bonded points per unit volume (unit: the number of bonded points/cm$^3$) in the piece by the apparent density (unit: g/cm$^3$) of the piece. The number of bonded points is measured by a method of detaching a welded part by pulling two linear structures; and measuring the number of detachments. It should be noted that, in the case of a network structure that has a 0.005 g/cm$^3$ or greater band-like difference in apparent density along the length or width direction of the sample, the number of bonded points per unit weight is measured by cutting a sample so that the border between a dense portion and a sparse portion runs through the center of the piece along the length or width direction.

In the case of the network structure having a linear structure with a hollow cross section as in the present invention, a collision sound between linear structures becomes high and offensive to the ears as the weight of the linear structure is reduced. Therefore, the present invention has achieved the object by providing a technique for reducing the fiber diameter and a technique for increasing the number of bonded points at the same time. Specifically, the more the fiber diameter is reduced, rigidity of the linear structure is decreased, and a collision sound (also referred to as a popping sound) of the linear structure is reduced. On the other hand, the larger the number of bonded points, the linear structures are fixed, and the linear structures less frequently collide with each other, whereby the quietness of the network structure is improved. The present invention is characterized in using these two procedures at the same time. In a conventional network structure of a linear structure with a hollow cross section, the number of bonded points per unit weigh is less than 200/g, or even when the number of bonded points per unit weight is not less than 200/g, the fiber diameter of the linear structure is more than 0.65 mm. However, in the present invention, the number of bonded points per unit weigh is set to not less than 200/g, and also the fiber diameter of the linear structure is not more than 0.65 mm, whereby it is possible to achieve desired effects. On the other hand, when the number of bonded points per unit weight is not less than 500/g, it is not preferable since soft cushion feeling may be impaired. The number of bonded points per unit weight is preferably in a range of not less than 250/g and less than 500/g, and further preferably in a range of not less than 300/g and less than 500/g. Also, when the fiber diameter of the linear structure is less than 0.10 mm, it is not preferable since the compression resistance force becomes too small and may lose a function of a cushioning material. The fiber diameter of the linear structure is preferably in a range of not less than 0.12 mm and not more than 0.63 mm, and further preferably not less than 0.15 mm and not more than 0.60 mm.

An outer surface of the network structure preferably has a surface layer portion in which a curled linear structure is bent in the middle by not less than 30°, preferably not less than 450, and the surface is substantially flattened, and most contacted parts are welded. This greatly increases the number of contacted points of the linear structures in the surface of the network structure and forms bonded points. Therefore, local external force caused by the buttocks when a user sits down is received at the surface of the structure without feeling of a foreign substance in the buttocks, the whole surface structure undergoes deformation and the internal structure as a whole also undergoes deformation to absorb the stress, and, when the stress is removed, the rubber elasticity of the elastic resin is generated and the structure can recover its original shape. In the case where the surface is not substantially flattened, the buttocks may have feeling of a foreign substance, local external force may be applied to the surface, and the linear structures and even the bonded points in the surface may selectively cause a concentrated stress. This concentrated stress may cause fatigue and a decrease in settling resistance. In the case where the outer surface of the structure is flattened, the surface of the structure may be covered with a cover and the structure may be used for seats for vehicles, seats for trains, chairs or cushion mats for beds, sofas, mattresses and the like without the use of wadding layers or with a very thin layer of wadding. In the case where the outer surface of the structure is not flattened, the surface of the network structure needs a stack of a relatively thick (preferably not less than 10 mm) layer of wadding and needs to be covered with a cover before the structure is made into a seat or a cushion mat. Bonding the structure to a layer of wadding or a cover according to need is easy in the case where the surface is flat. However, the bonding cannot be perfect in the case where the structure is not flattened because the surface is uneven.

In a random loop bonded structure which is the network structure of the present invention, the average apparent density is not particularly limited, and is preferably within a range of not less than 0.005 g/cm$^3$ and not more than 0.100 g/cm$^3$. The random loop bonded structure having an average apparent density within the above range is expected to show the function of a cushioning material. The average apparent density of less than 0.005 g/cm$^3$ fails to provide repulsive force, and thus the random loop bonded structure is unsuitable for a cushioning material. The average apparent density exceeding 0.100 g/cm$^3$ is not preferable from the viewpoint of lightweight properties. The apparent density in the present invention is more preferably not less than 0.010 g/cm$^3$ and not more than 0.80 g/cm$^3$, and further preferably within a range of not less than 0.020 g/cm$^3$ and not more than 0.60 g/cm$^3$.

As one aspect of the network structure of the present invention, a plurality of layers including linear structures having different fiber diameter can be laminated together and the apparent densities of the respective layers can be made different, whereby preferable properties can be imparted. For example, a base layer may be a layer including a somewhat hard linear structure having a thick fiber diameter, and a surface layer may be a layer that has a dense structure having a linear structure with a somewhat thin fiber diameter and a high density. The base layer may be a layer that serves to absorb vibration and retain the shape, and the surface layer may be a layer that can uniformly transmit vibration and repulsive stress to the base layer so that the whole body undergoes deformation to be able to convert energy, whereby comfortableness can be improved and the durability of the cushion can also be improved. Moreover, for the purpose of imparting a thickness and tension to the side portion of the cushion, the fiber diameter can be somewhat reduced partially so that the density can be increased. In this way, each layer may have any preferable density and fiber diameter depending on its purpose. It should be noted that the thickness of each layer of the network structure is not particularly limited. The thickness is preferably not less than 3 cm, and particularly preferably not less than 5 cm, which is likely to show the function of a cushioning material.

The 25%-compression hardness of the network structure of the present invention is not particularly limited, but is preferably not less than 50N/φ200-mm. The 25%-compression hardness is a stress at 25%-compression on a stress-strain curve obtained by compressing the network structure to 75% with a circular compression board measuring 200 mm in diameter. In the case where the 25%-compression hardness is less than 50N/φ200-mm, it is not possible to obtain a sufficient elastic force, and comfortable cushioning properties are lost. The 25%-compression hardness is more preferably not less than 70N/φ200-mm, particularly preferably not less than 100N/φ200-mm. The upper limit of the 25%-compression hardness is not particularly specified, but is preferably not more than 500N/φ200-mm, more preferably not more than 450N/φ200-mm, particularly preferably not more than 400N/φ200-mm. In the case where the 25%-compression hardness is more than 500N/φ200-mm, the network structure is too hard and is not preferable in terms of cushioning properties.

The compression-deflection coefficient of the network structure of the present invention is not particularly limited, and from the viewpoint of exhibiting comfortable sitting and sleep, the compression-deflection coefficient is preferably not less than 2.7. The compression-deflection coefficient is a value obtained by dividing the hardness at 65% compression by the hardness at 25% compression, and is used as an index for properly balancing floor contact feeling and soft feeling. The hardness at 65% compression shows a compression resistance force when the cushioning material sinks deeply, and when the value is larger, it is unlikely to bottom. On the other hand, the hardness at 25% compression shows a compression resistance force when the cushioning material sinks shallowly, and when the value is smaller, proper sinking can be obtained, and it is likely to provide soft feeling. Specifically, the larger the compression-deflection coefficient, it is unlikely to bottom and is likely to provide soft feeling, and it tends to lead to comfortable sitting and sleep. In the scope of the present invention, a mechanism of improving the compression-deflection coefficient is not sufficiently elucidated, but it is assumed to be related also to the fiber diameter and the number of bonded points. The compression-deflection coefficient is preferably in a range of not less than 2.7, and more preferably not less than 3.0. The upper limit of the compression-deflection coefficient is not particularly limited, but is preferably not more than 15.0. When the compression-deflection coefficient is larger than 15.0, strong repulsive force upon 65% sinking is provided without providing soft bottoming feeling, thus it is not preferable since some people may feel it hard.

Next, the following description discusses a method for producing a network structure including the three-dimensional random loop bonded structure of the present invention. The following method is one example and does not imply any limitation.

First, a thermoplastic elastomer is heated at a temperature higher than the melting point thereof by 10° C. or more and 120° C. or less and is molten using a common melt extruder. The molten resin is extruded out downward through a nozzle with a plurality of orifices, forming loops with free-fall. At this point, a distance between a nozzle face and a take-up conveyor disposed over a cooling medium for solidification of the resin, a melt viscosity of the resin, a hole size of an orifice, an amount of discharge, pull-in speed, etc. determine a diameter of loops, a fiber diameter of the linear structure, and the number of bonded points. A pair of take-up conveyors, having an adjustable gap, disposed over the cooling medium sandwich the discharged linear structure in a molten state, and hold the linear structure to form loops. By adjusting the pitch between the holes of the orifice so that the formed loops can contact, the formed loops are mutually contacted, and thereby the contacted portion mutually welds, while forming random three-dimensional shape. It should be noted that the pitch between holes of the orifices affects the number of bonded points. The pitch between holes should be short as much as possible in order to increase the number of bonded points, but when the pitch between holes is too short, the number of bonded points per unit weight is sometimes not less than 500, and soft cushion feeling may be impaired. The pitch between holes in the present invention is preferably in a range of not less than 4 mm and not more than 15 mm, and more preferably not less than 5 mm and not more than 20 mm. The array of the pitch is not particularly limited, but can be selected depending on a network structure forming lattice arrangement, staggered arrangement, circumferential arrangement, and the like. Subsequently, the continuous linear structure obtained by mutual welding of the contacted parts, while forming random three-dimensional shape, is continuously introduced into the cooling medium, and solidified, forming a network structure.

In the present invention, different densities and/or different fiber diameter can also be achieved according to need. Layers having different densities can be formed by, for example, a configuration in which the pitch between lines or the pitch between holes is also changed, or a method of changing both the pitch between lines and the pitch between holes. [*1]Furthermore, different fiber diameter can be achieved by making use of the principle in which the amount of molten thermoplastic elastomer discharged with a constant pressure through the same nozzle is smaller when using an orifice with larger pressure loss, e.g., in case of imparting a pressure loss difference at the time of discharge by changing the cross sectional areas of the orifices.

Next, opposite outer surfaces of the molten three-dimensional structure are sandwiched between take-up nets, discharged molten linear structures curled in the opposite surfaces are bent and deformed by not less than 30°, whereby the surfaces are flattened while the contacted points with non-bent discharged linear structures are bonded and a structure is formed. After that, the structure is rapidly cooled continuously with a cooling medium (usually, it is preferable to use water at room temperature because this allows for quick cooling and also low costs.) to thereby obtain a network structure including the three-dimensional random loop bonded structure of the present invention. Next, the network structure is drained and dried. Here, the addition of a surfactant etc. to the cooling medium is not preferable, because this may make it difficult to drain and dry the network structure or this may cause swelling of the thermoplastic elastomer. A preferred method in the present invention includes performing a pseudo-crystallization treatment after cooling. The temperature for the pseudo-crystallization treatment is at least 10° C. or more lower than the melting point (Tm), and the pseudo-crystallization treatment is performed at a temperature equal to or higher than the temperature (Tαcr) at the leading edge of α dispersion of Tan δ. This treatment causes the network structure to have an endothermic peak at or lower than the melting point, and remarkably improves the heat resistance and settling resistance of the network structure as compared to one that has not been subjected to the pseudo-crystallization treatment (having no endothermic peak). The temperature for the pseudo-crystallization treatment in the present invention is preferably (Tαcr+10° C.) to (Tm−20° C.). The pseudo-crystallization by a mere heat treatment improves the heat resistance and settling resistance. Further, it is more preferable that, after cooling, not less than 10%-deformation by compression is imparted and annealing is performed because this remarkably improves the heat resistance and settling resistance. Furthermore, in the case where a drying step is provided after cooling, the drying temperature can be set as the annealing temperature, whereby the pseudo-crystallization treatment can be performed at the same time. Alternatively, the pseudo-crystallization treatment can be performed separately.

Next, the network structure is cut into a desired length or shape to be used for a cushioning material. In the case of using the network structure of the present invention for a cushioning material, resins, fineness, diameters of loops, and bulk density to be used need to be selected based on purposes of use and parts for use. For example, in the case where the network structure is used for surface wadding, a finer fiber diameter and a fine diameter of loops with a lower density are preferably used in order to exhibit bulkiness having soft touch, moderate sinking and tension. In the case where the network structure is used as a middle portion cushioning body, a density of middle degree, a thicker diameter, and a little larger diameter of loops are preferred, in order to exhibit an excellent lower frequency of sympathetic vibration, a moderate hardness, good retention capacity of body shape by linear variation of hysteresis in compression, and to maintain durability. Of course, in order to make needed performance suitable for according usage, the network structure may also be used with other materials, for example, combination with hard cotton cushioning materials including staple fiber packed materials, and nonwoven fabrics. Furthermore, in a range where the performance is not reduced, there may be given treatment processing of chemicals addition for functions of flame-resistance, insect control antibacterial treatment, heat-resistance, water and oil repelling, coloring, fragrance, etc. in any stage of a process from the production to the molding and commercialization, even other than in the resin production process.

EXAMPLES

Hereinafter, the present invention will be described by way of Examples.

It should be noted that evaluations in Examples were performed in the following manner.

<Properties of Resin>

* Melting Point (Tm)

Using a differential scanning calorimeter Q200 available from TA Instruments Co., Ltd., 10 mg of a sample was subjected to measurement at a temperature rising rate of 20° C./minute from 20° C. to 250° C. to obtain an endothermic and exothermic curve. An endothermic peak (melting peak) temperature was found from the endothermic and exothermic curve.

* Flexural Modulus

With an injection molding machine, a sample piece measuring 125 mm in length×12 mm in width×6 mm in thickness was formed, and the sample piece was subjected to measurement in accordance with ASTM D790.

<Properties of Network Structure>

(1) Apparent Density

A sample was cut into the shape of a rectangular parallelepiped measuring 15 cm in length×15 cm in width so that the rectangular parallelepiped included two surface layers of the sample but did not include the peripheral portion of the sample, the heights of four corners of the rectangular parallelepiped were measured, and thereafter the volume ($cm^3$) was found, and the weight (g) of the sample was divided by the volume, whereby the apparent density ($g/cm^3$) was calculated. It should be noted that the apparent density was the average of n=4.

(2) Number of Bonded Points Per Unit Weight

A sample was cut into the shape of a rectangular parallelepiped measuring 5 cm in length×5 cm in width so that the rectangular parallelepiped included two surface layers of the sample but did not include the peripheral portion of the sample, whereby a piece was formed. Next, the heights of four corners of the piece were measured, and thereafter the volume (unit: $cm^3$) was found, and the weight (unit: g) of the sample was divided by the volume, whereby the apparent density (unit: $g/cm^3$) was calculated. Next, the number of bonded points in this piece was counted, the number was divided by the volume of the piece, whereby the number of bonded points per unit volume (unit: the number of bonded points/$cm^3$) was calculated. The number of bonded points per unit volume was divided by the apparent density, whereby the number of bonded points per unit weight (unit: the number of bonded points/gram) was calculated. It should be noted that a bonded point is a welded part between two linear structures. The number of bonded points was measured by a method of pulling two linear structures and detaching the welded part. Furthermore, the number of bonded points per unit weight was the average of n=2. Furthermore, in the case of a sample having a 0.005 $g/cm^3$ or greater band-like difference in apparent density along the length or width direction of the sample, the sample was cut so that the border between a dense portion and a sparse portion ran through the center of the piece along the length or width direction, and the number of bonded points per unit weight was measured in the same manner (n=2).

(3) Fiber Diameter of Linear Structure

A sample was cut into the shape of a rectangular parallelepiped measuring 30 cm in length×30 cm in width so that the rectangular parallelepiped included two surface layers of the sample but did not include the peripheral portion of the sample. About 5 mm of a linear structure not containing a bonded point was collected from 10 points within 30% from the thickness center point in the thickness direction of the sample. The side of the linear structure was focused at a proper magnification and imaged using an optical microscope. The fiber diameter of the linear structure is set to be the length in a direction perpendicular to a longitudinal direction of the linear structure by measured from the resulting image. Unit: mm (average of n=10).

(4) Degree of Hollowness

A sample was cut into the shape of a rectangular parallelepiped measuring 30 cm in length×30 cm in width so that the rectangular parallelepiped included two surface layers of the sample but did not include the peripheral portion of the sample, and the rectangular parallelepiped was divided into equally sized 4 cells. Linear structures measuring 1 cm in length were collected at 5 places per cell, 20 places in total, within 30% from the thickness center point in the thickness direction of the sample. The linear structures were cooled with liquid nitrogen, and then cut into pieces. A cross section of each piece was observed under an electron microscope at a magnification of 50 times, and the obtained image was analyzed using a CAD system. Thereby, the cross sectional area (A) of a resin portion and the cross sectional area (B) of a hollow portion were measured, and the degree of hollowness was calculated based on the equation $(B/(A+B))\times 100$ (average of n=20).

(5) Hardness at 2596 Compression, Hardness at 65% Compression, Compression-Deflection Coefficient A sample was cut into the shape of a rectangular parallelepiped measuring 30 cm in length×30 cm in width so that the rectangular parallelepiped included two surface layers of the sample but did not include the peripheral portion of the sample. The sample was left under no load and an environment of 23° C.±2° C. for 24 hours, and then measurement was performed according to ISO 2439 (2008) E method, using autograph AG-X plus manufactured by SHIMADZU CORPORATION, under an environment of 23° C.±2° C. The sample was arranged so that a pressure plate of φ200 mm came to the sample center, and the thickness when the load was 5 N was measured, and referred to as an initial thickness with a hardness tester. With the position of the pressure plate at this time as the zero point, pre-compression was once carried out at a rate of 100 mm/min up to 75% of the initial thickness with a hardness tester, and the pressure plate was returned to the zero point at the same speed and then left as it was for 4 minutes. Immediately after the predetermined time passed, compression was carried out to 25% and 65% of the initial thickness with a hardness tester at a rate of 100 mm/min, and the load at that time was measured, and referred to as hardness at 25% compression and hardness at 65% compression, respectively: unit N/φ200 (average value of n=3). Further, compression-deflection coefficient was calculated based on the equation (hardness at 65% compression)/(hardness at 25% compression), according to ISO 2439 (2008) E method.

(6) Floor Contact

On a rectangular parallelepiped sample prepared by cutting a sample into the shape of a rectangular parallelepiped measuring 50 cm in length×50 cm in width so that the rectangular parallelepiped sample included two surface layers of the sample, 30 panelists weighing 40 kg to 100 kg (the number of 20- to 39-year-old men; 5, the number of 20- to 39-year-old women: 5, the number of 40- to 59-year-old men: 5, the number of 40- to 59-year-old women: 5, the number of 60- to 80-year-old men: 5, the number of 60- to 80-year-old women: 5) sat down, and the panelists qualitatively evaluated the degree of feeling of "bumping" on the floor sensuously when they sat down. No feeling: Excellent, weak feeling: Good, moderate feeling; Moderate, strong feeling; Poor (7) Soft Feeling On a rectangular parallelepiped sample prepared by cutting a sample into the shape of a rectangular parallelepiped measuring 50 cm in length×50 cm in width so that the rectangular parallelepiped sample included two surface layers of the sample, 30 panelists weighing 40 kg to 100 kg (the number of 20- to 39-year-old men; 5, the number of 20- to 39-year-old women: 5, the number of 40- to 59-year-old men: 5, the number of 40- to 59-year-old women: 5, the number of 60- to 80-year-old men: 5, the number of 60- to 80-year-old women: 5) sat down, and the panelists qualitatively evaluated the degree of soft feeling when they sat down. Strong feeling; Excellent, moderate feeling; Good, weak feeling; Moderate, no feeling; Poor (8) Sound Deadening Property On a rectangular parallelepiped sample prepared by cutting a sample into the shape of a rectangular parallelepiped measuring 50 cm in length×50 cm in width so that the rectangular parallelepiped sample included two surface layers of the sample, 30 panelists weighing 40 kg to 100 kg (the number of 20- to 39-year-old men; 5, the number of 20- to 39-year-old women: 5, the number of 40- to 59-year-old men: 5, the number of 40- to 59-year-old women: 5, the number of 60- to 80-year-old men: 5, the number of 60- to 80-year-old women: 5) sat down, and the panelists qualitatively evaluated the sound coming from the network structure sensuously. No sound; Excellent, small sound; Good, moderate sound; Moderate, large sound; Poor Synthesis Example 1

Dimethyl terephthalate (DMT), 1,4-butanediol (1,4-BD) and polytetramethylene glycol (PTMG: average molecular weight 1000) were charged together with a small amount of a catalyst, transesterification was performed by a conventional method, and thereafter the resultant was subjected to polycondensation with increasing temperature under reduced pressure, whereby a polyester-ether block copolymer elastomer of DMT/1,4-BD/PTMG=100/88/12 mol % was prepared. Next, 1% antioxidant was added thereto, and the resultant was mixed and kneaded, and thereafter the mixture was made into pellets. The pellets were dried in a vacuum at 50° C. for 48 hours, whereby a polyester thermoplastic elastomer raw material (A-1) was obtained. The properties of the polyester thermoplastic elastomer raw material are shown in Table 1.

Synthesis Example 2

Dimethyl terephthalate (DMT), 1,4-butanediol (1,4-BD) and polytetramethylene glycol (PTMG: average molecular weight 1000) were charged together with a small amount of a catalyst, transesterification was performed by a conventional method, and thereafter the resultant was subjected to polycondensation with increasing temperature under reduced pressure, whereby a polyester-ether block copolymer elastomer of DMT/1,4-BD/PTMG=100/84/16 mol % was prepared. Next, 1% antioxidant was added thereto, and the resultant was mixed and kneaded, and thereafter the mixture was made into pellets. The pellets were dried in a vacuum at 50° C. for 48 hours, whereby a polyester thermoplastic elastomer raw material (A-2) was obtained. The properties of the polyester thermoplastic elastomer raw material are shown in Table 1.

Synthesis Example 3

Dimethyl terephthalate (DMT), 1,4-butanediol (1,4-BD) and polytetramethylene glycol (PTMG: average molecular weight 1000) were charged together with a small amount of a catalyst, transesterification was performed by a conventional method, and thereafter the resultant was subjected to polycondensation with increasing temperature under reduced pressure, whereby a polyester-ether block copolymer elastomer of DMT/1,4-BD/PTMG=100/72/28 mol % was prepared. Next, 1% antioxidant was added thereto, and the resultant was mixed and kneaded, and thereafter the mixture was made into pellets. The pellets were dried in a vacuum at 50° C. for 48 hours, whereby a polyester thermoplastic elastomer raw material (A-3) was obtained. The properties of the polyester thermoplastic elastomer raw material are shown in Table 1.

Synthesis Example 4

Ethylene and vinyl acetate were radically copolymerized to form an ethylene-vinyl acetate copolymer (EVA) of a vinyl acetate content of 10%, and subsequently, 2% of an antioxidant was added thereto, and the mixture was mixed and kneaded, and then pelletized. The ethylene-vinyl acetate copolymer (EVA) had a vinyl acetate content of 10%, a specific weight of 0.929, and a melting point of 95° C.

TABLE 1

| | | | Properties of resin | |
|---|---|---|---|---|
| | Type of resin | Composition of resin | Melting point | Flexural modulus |
| Synthesis Example 1 | A-1 | DMT/1,4-BD/PTMG = 100/88/12 | 203° C. | 0.16 Gpa |
| Synthesis Example 2 | A-2 | DMT/1,4-BD/PTMG = 100/84/16 | 200° C. | 0.11 GPa |
| Synthesis Example 3 | A-3 | DMT/1,4-BD/PTMG = 100/72/28 | 170° C. | 0.05 GPa |

Example 1

100 kg of the polyester thermoplastic elastomer (A-1) obtained in Synthesis Example 1, 0.25 kg of a hindered phenol antioxidant ("ADEKA STAB AO330" available from ADEKA CORPORATION) and 0.25 kg of a phosphorus antioxidant ("ADEKA STAB PEP36" available from ADEKA CORPORATION) were mixed in a tumbler for 5 minutes. After that, the mixture was melted and kneaded with a φ57-mm twin screw extruder at a cylinder temperature of 220° C. and a screw speed of 130 rpm, extruded into the form of a strand in a water bath and cooled, and thereafter pellets of a resin composition were obtained. The obtained resin composition was melted at a temperature of 250° C., and discharged through a nozzle in which round hollow-shaped orifices with a hole size of 3.0 mm are arranged on a nozzle surface area with a width of 66 cm and a length of 5 cm at intervals of 6 mm in an amount of 2.4 g/minute per single hole. Cooling water was arranged at a position 38 cm under the nozzle face. Endless nets made from stainless steel having a width of 70 cm were disposed parallel in an interval of 4 cm to form a pair of take-up conveyors, partially exposed over a water surface. The copolymer raw material extruded was taken up on this conveyor, while being welded on the contacted parts, and sandwiched from both sides. The sandwiched material was introduced into cooling water with a speed of 2.9 m/minute to be solidified, then subjected to a pseudo-crystallization treatment for 15 minutes in a hot-air drier at 100° C., and then cut into a predetermined size, whereby a network structure was obtained. The properties of the obtained network structure are shown in Table 2.

Example 2

A network structure was obtained in the same manner as in Example 1, except for melting the resin composition at a temperature of 260° C. and distributing cooling water at 45 cm below a nozzle surface. The properties of the obtained network structure are shown in Table 2.

Example 3

A network structure was obtained in the same manner as in Example 1, except for using the polyester-based thermoplastic elastomer (A-2) obtained in Synthesis Example 2, melting the resin composition at a temperature of 235° C. and distributing cooling water at 35 cm below a nozzle surface. The properties of the obtained network structure are shown in Table 2.

Example 4

A network structure was obtained in the same manner as in Example 1, except for using the polyester-based thermoplastic elastomer (A-2) obtained in Synthesis Example 2, melting the resin composition at a temperature of 240° C., distributing cooling water at 37 cm below a nozzle surface, and introducing the molten resin composition into the cooling water at a rate of 2.6 m per minute. The properties of the obtained network structure are shown in Table 2.

Example 5

A network structure was obtained in the same manner as in Example 1, except for using the polyester-based thermoplastic elastomer (A-2) obtained in Synthesis Example 2, arranging orifices at intervals of 8 mm, melting the resin composition at a temperature of 240° C., distributing cooling water at 36 cm below a nozzle surface, and introducing the molten resin composition into the cooling water at a rate of 1.8 m per minute. The properties of the obtained network structure are shown in Table 2.

Example 6

A network structure was obtained in the same manner as in Example 1, except for using the polyester-based thermoplastic elastomer (A-3) obtained in Synthesis Example 3, arranging orifices at intervals of 8 mm, melting the resin composition at a temperature of 220° C., distributing cooling water at 39 cm below a nozzle surface, distributing stainless endless nets in parallel at 4.5 cm intervals so that a pair of take-up conveyors partially exposed over the water surface, and introducing the molten resin composition into the cooling water at a rate of 1.6 m per minute. The properties of the obtained network structure are shown in Table 2.

Example 7

A network structure was obtained in the same manner as in Example 1, except for using the ethylene-vinyl acetate copolymer (EVA) obtained in Synthesis Example 4, arranging orifices at intervals of 7 mm, melting the resin composition at a temperature of 200° C., setting the single hole discharge amount at 2.0 g/min, distributing cooling water at 30 cm below a nozzle surface, distributing stainless endless nets in parallel at 4.5 cm intervals so that a pair of take-up conveyors partially exposed over the water surface, introducing the molten resin composition into the cooling water at a rate of 1.3 m per minute, and pseudo-crystallizing the resultant product in a hot-air dryer at 70° C. The properties of the obtained network structure are shown in Table 2.

Example 8

A network structure was obtained in the same manner as in Example 1, except for using 100 kg of linear low-density polyethylene ("Nipolon-Z 1P55A" manufactured by Tosoh Corporation), arranging orifices at intervals of 7 mm, melting the resin composition at a temperature of 210° C., setting the single hole discharge amount at 2.0 g/min, distributing cooling water at 33 cm below a nozzle surface, distributing stainless endless nets in parallel at 4.5 cm intervals so that a pair of take-up conveyors partially exposed over the water surface, introducing the molten resin composition into the cooling water at a rate of 1.4 m per minute, and pseudo-crystallizing the resultant product in a hot-air dryer at 60° C. The properties of the obtained network structure are shown in Table 2.

Comparative Example 1

A network structure was obtained in the same manner as in Example 1, except for using a nozzle in which round hollow-shaped orifices with a hole size of 5.0 mm were arranged on a nozzle effective surface with a width of 64 cm and a length of 4.8 cm at intervals of 8 mm, melting the resin composition at a temperature of 245° C., discharging the molten resin composition at a single hole discharge amount of 3.6 g/min, distributing cooling water at 35 cm below a nozzle surface, and introducing the discharged resin composition into the cooling water at a rate of 2.2 m per minute. The properties of the obtained network structure are shown in Table 2.

Comparative Example 2

A network structure was obtained in the same manner as in Example 1, except for using the polyester-based thermoplastic elastomer (A-2) obtained in Synthesis Example 2, using a nozzle in which round hollow-shaped orifices with a hole size of 5.0 mm were arranged on a nozzle effective surface with a width of 64 cm and a length of 4.8 cm at intervals of 8 mm, melting the resin composition at a temperature of 240° C., discharging the molten resin composition at a single hole discharge amount of 3.6 g/min, and introducing the discharged resin composition into the cooling water at a rate of 2.0 m per minute. The properties of the obtained network structure are shown in Table 2.

Comparative Example 3

A network structure was obtained in the same manner as in Example 1, except for using the polyester-based thermoplastic elastomer (A-2) obtained in Synthesis Example 2, melting the resin composition at a temperature of 240° C., discharging the molten resin composition at a single hole discharge amount of 1.6 g/min, distributing cooling water at 25 cm below a nozzle surface, and introducing the discharged resin composition into the cooling water at a rate of 1.4 m per minute. The properties of the obtained network structure are shown in Table 2.

Comparative Example 4

A network structure was obtained in the same manner as in Example 1, except for using the polyester-based thermoplastic elastomer (A-2) obtained in Synthesis Example 2, using a nozzle in which round hollow-shaped orifices with a hole size of 4.0 mm were arranged at intervals of 7 mm, discharging the molten resin composition at a single hole discharge amount of 2.0 g/min, distributing cooling water at 40 cm below a nozzle surface, and introducing the discharged resin composition into the cooling water at a rate of 1.2 m per minute. The properties of the obtained network structure are shown in Table 2.

Comparative Example 5

A network structure was obtained in the same manner as in Example 1, except for using the polyester-based thermoplastic elastomer (A-3) obtained in Synthesis Example 3, using a nozzle in which round hollow-shaped orifices with a hole size of 5.0 mm were arranged on a nozzle effective surface with a width of 64 cm and a length of 4.8 cm at intervals of 8 mm, melting the resin composition at a temperature of 230° C., discharging the molten resin composition at a single hole discharge amount of 3.6 g/min, and introducing the discharged resin composition into the cooling water at a rate of 2.0 m per minute. The properties of the obtained network structure are shown in Table 2.

Comparative Example 6

A network structure was obtained in the same manner as in Example 1, except for using the ethylene-vinyl acetate copolymer (EVA) obtained in Synthesis Example 4, using a nozzle in which round solid-shaped orifices with a hole size of 2.0 mm were arranged on a nozzle effective surface with a width of 66 cm and a length of 5 cm at intervals of 12 mm, melting the resin composition at a temperature of 180° C., discharging the molten resin composition at a single hole discharge amount of 3.0 g/min, distributing cooling water at 25 cm below a nozzle surface, introducing the discharged resin composition into the cooling water at a rate of 1.0 m per minute, and pseudo-crystallizing the resultant product in a hot-air dryer at 70° C. The properties of the obtained network structure are shown in Table 2.

Comparative Example 7

A network structure was obtained in the same manner as in Example 1, except for using linear low-density polyethylene ("Nipolon-Z 1P55A" manufactured by Tosoh Corporation), using a nozzle in which round solid-shaped orifices with a hole size of 2.0 mm were arranged on a nozzle effective surface with a width of 66 cm and a length of 5 cm at intervals of 8 mm, melting the resin composition at a temperature of 190° C., discharging the molten resin composition at a single hole discharge amount of 3.0 g/min, distributing cooling water at 25 cm below a nozzle surface, introducing the discharged resin composition into the cooling water at a rate of 2.0 m per minute, and pseudo-crystallizing the resultant product in a hot-air dryer at 70° C. The properties of the obtained network structure are shown in Table 2.

TABLE 2

| Experiment No. | Resin material of constituting continuous linear structure | Cross sectional shape of continuous linear structure | Degree of hollowness (%) | Fiber diameter (mm) | Thickness (cm) | Apparent density (g/cm³) | Number of bonded points per unit weight (/g) | Hardness at 25% compression (N/ø 200 mm) | Compression-deflection coefficient | Floor contact | Soft feeling | Sound deadening property |
|---|---|---|---|---|---|---|---|---|---|---|---|---|
| Example-1 | A-1 | Round hollow | 31 | 0.55 | 4.1 | 0.035 | 388 | 137 | 3.6 | Excellent | Excellent | Excellent |
| Example-2 | A-1 | Round hollow | 29 | 0.42 | 4.1 | 0.035 | 479 | 118 | 3.9 | Excellent | Excellent | Excellent |
| Example-3 | A-2 | Round hollow | 29 | 0.61 | 3.9 | 0.035 | 410 | 118 | 2.8 | Excellent | Excellent | Excellent |
| Example-4 | A-2 | Round hollow | 27 | 0.58 | 4.0 | 0.040 | 452 | 127 | 3.4 | Excellent | Excellent | Excellent |
| Example-5 | A-2 | Round hollow | 27 | 0.58 | 4.0 | 0.045 | 489 | 157 | 3.1 | Excellent | Excellent | Excellent |
| Example-6 | A-3 | Round hollow | 30 | 0.63 | 4.5 | 0.060 | 422 | 78 | 3.8 | Excellent | Excellent | Excellent |
| Example-7 | EVA | Round hollow | 19 | 0.63 | 4.5 | 0.050 | 280 | 69 | 4.6 | Excellent | Excellent | Excellent |
| Example-8 | LLDPE | Round hollow | 25 | 0.64 | 4.3 | 0.053 | 325 | 88 | 4.2 | Excellent | Excellent | Excellent |
| Comparative Example-1 | A-1 | Round hollow | 40 | 0.90 | 4.0 | 0.040 | 152 | 147 | 2.3 | Excellent | Poor | Poor |
| Comparative Example-2 | A-2 | Round hollow | 39 | 1.00 | 4.0 | 0.045 | 160 | 147 | 2.4 | Excellent | Poor | Poor |
| Comparative Example-3 | A-2 | Round hollow | 28 | 0.68 | 3.9 | 0.043 | 339 | 118 | 2.6 | Excellent | Moderate | Poor |
| Comparative Example-4 | A-2 | Round hollow | 9 | 0.70 | 4.2 | 0.062 | 620 | 255 | 2.5 | Excellent | Poor | Excellent |
| Comparative Example-5 | A-3 | Round hollow | 38 | 1.00 | 4.0 | 0.045 | 170 | 39 | 2.9 | Poor | Good | Good |
| Comparative Example-6 | EVA | Round soild | 28 | 0.91 | 4.0 | 0.073 | 185 | 108 | 2.5 | Poor | Good | Good |
| Comparative Example-7 | LLDPE | Round solid | 39 | 1.00 | 4.1 | 0.050 | 205 | 39 | 2.7 | Poor | Good | Moderate |

INDUSTRIAL APPLICABILITY

The present invention relates to a network structure that has high lightweight properties and shows excellent quietness. Utilizing these properties, the network structure can be used for seats for vehicles and mattresses, etc.

The invention claimed is:

1. A network structure comprising a three-dimensional random loop bonded structure obtained by forming random loops by curling treatment of a continuous linear structure comprising a thermoplastic resin, and by making each loop mutually contact in a molten state to weld the majority of contacted parts, wherein
    (a) the continuous linear structure is a hollow cross section,
    (b) the degree of hollowness of the hollow cross section is not less than 10% and not more than 50%,
    (c) the fiber diameter of the continuous linear structure is not less than 0.42 mm and not more than 0.64 mm, and
    (d) the number of bonded points per unit weight of the random loop bonded structure is not less than 200/g and less than 500/g.

2. The network structure according to claim 1, wherein the degree of hollowness of the hollow cross section is not less than 15% and not more than 45%.

3. The network structure according to claim 1, wherein the compression-deflection coefficient of the random loop bonded structure is not less than 2.7.

4. The network structure according to claim 3, wherein the compression-deflection coefficient of the random loop bonded structure is not less than 3.0.

5. The network structure according to claim 1, wherein the thermoplastic resin is at least one thermoplastic resin selected from the group consisting of a soft polyolefin, an ethylene-vinyl acetate copolymer, a polystyrene thermoplastic elastomer, a polyester thermoplastic elastomer, a polyurethane thermoplastic elastomer and a polyamide thermoplastic elastomer.

6. The network structure according to claim 5, wherein the thermoplastic resin is at least one thermoplastic resin selected from the group consisting of a soft polyolefin, an ethylene-vinyl acetate copolymer, and a polyester thermoplastic elastomer.

7. The network structure according to claim 6, wherein the thermoplastic resin is a polyester thermoplastic elastomer.

* * * * *